US007925769B2

(12) United States Patent
Gavagni et al.

(10) Patent No.: US 7,925,769 B2
(45) Date of Patent: Apr. 12, 2011

(54) MEDIA FLOW CONVERTER FOR USE IN REAL-TIME DELIVERY TRANSACTIONS

(75) Inventors: Brett J. Gavagni, Sunrise, FL (US); Brien H Muschett, Palm Beach Gardens, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1540 days.

(21) Appl. No.: 11/286,922

(22) Filed: Nov. 23, 2005

(65) Prior Publication Data

US 2007/0116039 A1    May 24, 2007

(51) Int. Cl.
*G06F 15/16* (2006.01)
*G06F 15/173* (2006.01)
*H04L 12/28* (2006.01)

(52) U.S. Cl. ........ 709/230; 709/203; 709/218; 709/231; 709/236; 709/240; 709/249; 709/250; 370/230.1; 370/231; 370/352; 370/395.41; 370/465

(58) Field of Classification Search .................. 709/231, 709/250, 203, 217, 218, 236, 240; 370/231, 370/235, 352, 395.4, 465, 466, 230.1, 295.41
See application file for complete search history.

(56) References Cited

U.S. PATENT DOCUMENTS

| | | | | |
|---|---|---|---|---|
| 5,930,752 | A * | 7/1999 | Kawaguchi et al. | 704/270.1 |
| 6,970,183 | B1 * | 11/2005 | Monroe | 348/143 |
| 7,051,337 | B2 * | 5/2006 | Srikantan et al. | 719/318 |
| 7,161,939 | B2 * | 1/2007 | Israel et al. | 370/389 |
| 7,197,461 | B1 * | 3/2007 | Eberle et al. | 704/275 |
| 7,668,155 | B2 * | 2/2010 | Omori et al. | 370/352 |
| 2002/0057713 | A1 * | 5/2002 | Bagchi et al. | 370/468 |
| 2002/0150082 | A1 * | 10/2002 | Celi, Jr. | 370/352 |
| 2003/0236689 | A1 | 12/2003 | Casati et al. | |
| 2004/0191744 | A1 | 9/2004 | Guirguis | |
| 2005/0243981 | A1 * | 11/2005 | Creamer et al. | 379/88.22 |
| 2007/0043868 | A1 * | 2/2007 | Kumar et al. | 709/226 |

OTHER PUBLICATIONS

Henning Schulzrinne, A Transport Protocol for Audio and Video Conferences and other Multiparticipant Real-Time Application, Jul. 20, 1992, Univeristy of Massachusetts at Amherst, pp. 1-20.*
Schmandt, C., et al., "Desktop Audio", Unix Review, vol. 7, No. 10, pp. 54-62, Oct. 1989.
Chen, Z., et al., "Real time video and audio in the World Wide Web", Proc. 4th Int'l. World Wide Web Conference, Dec. 1995.
Schulzrinne, H., "RTP: About TRP and the Audio-Video Transport Working Group", Columbia Univ., May 10, 1997.
Godwin-Jones, B., "Emerging Technologies, Real-time Audio and Video Playback on the Web", Lang. Learning & Tech., vol. 1, No. 1, pp. 5-8, Jul. 1997.

* cited by examiner

*Primary Examiner* — Shawki S Ismail
*Assistant Examiner* — Farzana Huq
(74) *Attorney, Agent, or Firm* — Novak Druce + Quigg LLP

(57) ABSTRACT

A method (200) and a system (100) for coordinated streaming use a single Real Time Protocol (RTP) producer (130) for handling multiple audio services (110). The method can include the steps of assigning (202) a RTP producer to handle multiple audio objects, and maintaining (204) a service for each object in accordance with a delivery schedule. RTP packets can be sent in accordance with the delivery schedule for complying with real-time requirements of a media rendering client thereby providing continuous real-time service delivery. The method can further include determining a wait time and updating the delivery schedule in view of the wait time. In one arrangement, the RTP producer can sleep for a pre-specified interval, and upon wake, prioritizes service delivery based on an audio object's wait time.

12 Claims, 3 Drawing Sheets

MEDIA FLOW CONVERTER FOR USE IN REAL-TIME DELIVERY TRANSACTIONS

BACKGROUND OF THE INVENTION

1. Technical Field

The present invention relates to the field of network application services, and more particularly, to single threaded real-time audio streaming.

2. Description of the Related Art

International Business Machine Corporation's WebSphere Voice Server (WVS) is a collection of technologies that provide for the creation of voice based applications. It allows users to access voice-enabled Web applications through a telephone and allows software developers to enable voice services on Web applications. VoiceXML applications can be developed in WVS and hosted on an application server such as International Business Machine's WebSphere Application Server. The (WAS) is a Java based Web application server that supports the deployment and management of Web applications, ranging from simple Web sites to powerful e-business solutions. The integration of WVS technologies with the WAS provide for the development of powerful voice centric e-business solutions.

The WAS is based on the J2EE platform for building distributed enterprise applications. Most WebSphere applications written for J2EE use a model-view-controller architecture for separation of design concerns. One approach for enhancing the scalability and resiliency of the WAS is workload management which defines policies that dictate how requests are distributed to the applications. However, control is centralized, and underlying operational processes concerning the integration of WVS on WAS encounter challenges with regards to providing real-time delivery of audio in audio transaction based J2EE applications. In a real-time voice service supported by a WVS running on a WAS, audio must be delivered to a client in a continuous manner to avoid poor audio quality, else the audio is perceived as broken or choppy. Consistent delivery of audio concerning the media flow depends on the timing granularity. The timing granularity describes the accuracy and resolution by which the application and system can support timed services. The timing granularity can be limited by the application or the underlying operating system. In a voice streaming application, the WVS needs to send voice packets at fixed time intervals using a Real Time Protocol (RTP) to satisfy real-time demands of the client for continuous voice.

RTP provides end-to-end network transport functions suitable for applications transmitting real-time data, such as audio, video or simulation data, over network services. However, RTP does not address resource reservation and does not guarantee quality-of-service for real-time services. Multi-threaded approaches to increasing RTP efficiency involve assigning single processes (threads) to handle multiple media streams. Each thread can be responsible for handling delivery transmissions to the client without regard to the processing overhead consumed by other threads providing other media services. Each thread can consume Central Processing Unit time which affects the timing granularity available to all the threads. As more processes are added, more threads that require administrative overhead degrade the integrity of service quality.

Timer services in an operating system kernel can have the timing granularity to support RTP delivery for a few separate voice streaming applications. However, timing granularity degrades as more RTP traffic emerges which can reach a resolution limit when too many applications are running ensemble. Coordinating simultaneous processes consumes significant administrative overhead which costs time thereby sacrificing timing granularity. Accordingly, the timing services lack the granularity to support high volume RTP service for hundreds or thousands of voice streaming applications, and this results in poor audio quality. Workload management solutions which assign separate processes to handle each audio stream work well for low and high volume traffic that do not require real-time capabilities. For example, music streaming applications have minimal real-time constraints since music is one-way. However, voice streaming applications are limited by real-time constraints since conversations are usually two-way. During a voice dialogue, users expect to receive voice within a certain period of time, else they are disconcerted with the service quality. Therefore, a need exists to provide a solution that allows for the efficient delivery of voice based application services under multiple real-time continuous streaming service demands.

SUMMARY OF THE INVENTION

The invention disclosed herein concerns a method and a system for coordinated streaming using a single Real Time Protocol (RTP) producer for handling multiple audio services. The method can include the steps of assigning a RTP producer to handle multiple audio objects, and maintaining a service delivery for the multiple audio objects to provide a service to a client. The RTP producer can coordinate a delivery of service among multiple audio objects using a delivery schedule. The delivery schedule can identify which clients are receiving a service and from which audio object. The audio objects can send RTP packets in accordance with the delivery schedule for complying with real-time requirements of a client, thereby providing continuous real-time service delivery.

The method can further include determining the time an audio object has been waiting to send RTP packets, and updating the delivery schedule in view of the wait time. For example, the RTP producer can sleep for a pre-specified interval, and upon wake, prioritize service delivery based on the wait time of an audio object. The RTP producer can prioritize the delivery for audio objects which have been waiting longer than other audio objects. The RTP producer can also obtain reference to a native timer which can determine the sleep time and wait time.

For example, the RTP producer can be a single real-time thread that operates on a set of small audio objects according to a delivery schedule. After sleeping for a pre-specified time interval, the RTP producer can call a method in each audio object. For example, a 'send' method of the audio objects can decide whether it is 'time' to send another RTP packet to a client from its audio queue. The audio objects can each have their own thread of execution apart from the RTP producer thread. These are separate audio threads that can operate in non real-time to receive audio data from the services. The single real-time thread of the RTP producer can operate in real time to provide a continuous service. The non-real time threads of the audio objects can build the audio queue and convert the audio data to RTP packets on the queue. The RTP producer can call on an audio object to remove RTP packets from the queue and send them to a client based on the delivery schedule.

The invention also concerns a method for use in a Web-based voice application hosted by a server for packetizing at least one media stream into a continuous media stream. The method can include receiving a media stream on an audio channel, each audio channel having a corresponding audio thread for controlling access to the audio channel, and packetizing the media stream into RTP packets on an audio queue within the audio channel. The method can further include removing RTP packets from the audio queue and sending RTP packets to at least one media rendering client. An RTP producer can receive audio data in non-real time from an audio object and send RTP packets of the audio data to a client in real-time. The sending provides at least one service application running on the server. For example, the RTP packets can be removed and sent based on a delivery schedule established by the single RTP producer thread In one arrangement, at least one service application can be one of a text-to-speech service, an audio processing service, and a music processing service. In another arrangement, at least one service application can be provided by a WebSphere Voice Server running on a server, where the server is a WebSphere Application Server. The WebSphere Voice Server can be integrated with the WebSphere Application Server for providing a mix of Java transaction based processing and soft-real-time processing for interfacing with the media converter using a J2EE framework.

Accordingly, within a WebSphere Voice Server application hosted by a WebSphere Application Server, the method in one embodiment can include packetizing at least one non-real-time media stream into a continuous real-time media stream for RTP delivery. The RTP delivery can comply with real-time requirements of a media rendering client to provide continuous real-time delivery of said continuous media stream. The method can include receiving audio media from at least one service, in at least one audio thread, packetizing said audio media to RTP packets, in said at least one audio thread, placing said RTP packets on a queue in non-real time, at an RTP producer thread, waking up from a sleep, at the RTP producer thread, based on a thread schedule, checking said at least one audio thread for timing information, removing RTP packets from said queue, and sending RTP packets to at least one media rendering client. The thread schedule can comply with real-time requirements of the media rendering client.

The present invention also concerns a media flow converter for use with a server for coordinated streaming using a single Real Time Protocol (RTP) producer for handling multiple audio services. The media flow component includes at least one service application running on said server, and a media converter interfacing with the service application for receiving at least one media stream. The media stream can corresponds with at least one service. The media converter can arrange at least one of a number of media stream into at least one continuous media stream. The media flow component also includes at least one media rendering client communicatively linked to the media converter for receiving at least one of the continuous media streams from the server. For example, a continuous media stream can correspond to at least one media stream associated with a service for rendering the service in real-time.

In another arrangement, the media converter further can include at least one of a plurality of audio threads each supporting an audio channel. Each audio thread can packetize a media stream into RTP packets. A single priority thread can schedule access to the audio threads using a thread schedule. For example, the media converter can retrieve RTP packets from the audio channels based on a single priority thread schedule that can send the RTP packets to at least one media rendering client. The thread schedule can comply with real-time requirements of said media rendering client for providing continuous real-time delivery from the server to the continuous media stream.

Another aspect of the invention can include an audio queue for receiving a media stream which can be partitioned into packets placed in the audio queue. A service application can provide the media stream in a service application. For example, a service application can be a voice recognition service, a text-to-speech service, an audio processing service, or a music processing service. In another arrangement, the single priority thread can control communication between a WebSphere Voice Server and WebSphere Application Server for achieving real-time delivery. The WebSphere Voice Server can be integrated with the WebSphere Application Server for providing a mix of java transaction based processing and soft-real-time processing for interfacing with said media converter using a J2EE framework. For example, the WebSphere Voice Server can provide speech recognition and synthesis service support to a media converter hosting a Web-based VoiceXML application. The service can support at least one real-time continuous media stream connecting the WebSphere Application Server with the Web-based VoiceXML application.

In yet another arrangement, the media converter can further include a native timer for obtaining a native clock to packetize said media stream into said at least one continuous media stream complying with RTP delivery requirements of said media rendering client for providing continuous real-time delivery of said continuous media stream. For example, the native clock can be an operating system clock or an Applications Programming Interface (API) sleep method.

BRIEF DESCRIPTION OF THE DRAWINGS

There are shown in the drawings embodiments which are presently preferred, it being understood, however, that the invention is not limited to the precise arrangements and instrumentalities shown.

DESCRIPTION OF THE INVENTION

A method and a system for coordinated streaming use a single Real Time Protocol (RTP) producer for handling multiple audio services. The method can include the steps of assigning a single high priority thread to the RTP producer for scheduling access to at least one audio object using a delivery schedule, and sending RTP packets contained within at least one audio channel to a media rendering client according to the thread schedule. For example, each audio object can control access to at least one audio channel containing the RTP packets. In one arrangement, the RTP packet can be sent according to a delivery schedule that complies with real-time requirements of the media rendering client for providing continuous real-time delivery from the server.

The invention employs a single high priority thread to delegate media transmission (delivery) for overcoming limitation issues of assigning individual processes to handle services. Assigning a single high priority thread to handle all audio thread services reduces demand on the timing granularity and increases RTP delivery resolution. Assigning a single high priority thread reduces competition between the other audio threads attempting to deliver real time media to clients.

Figure 1:
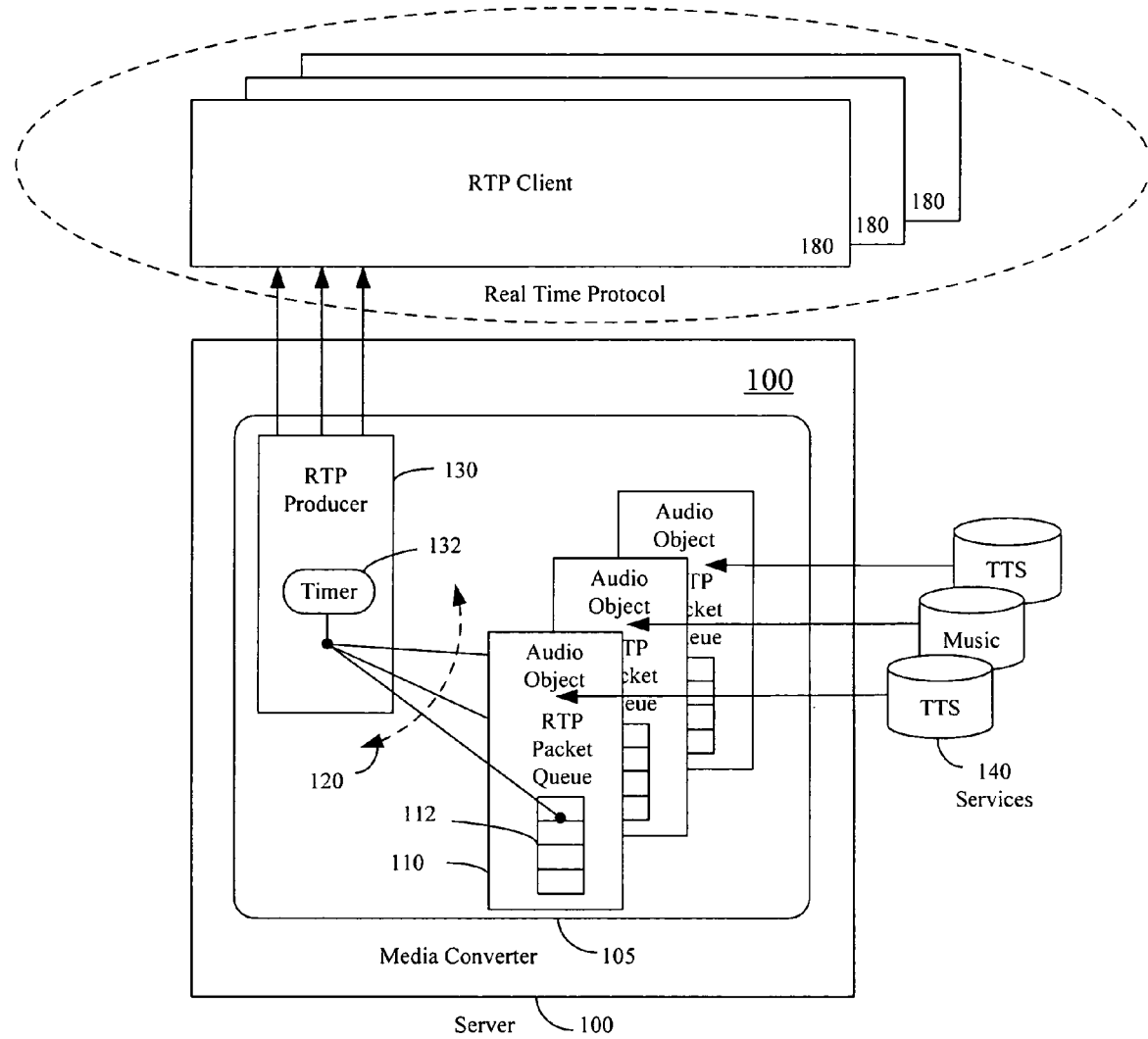
FIG. 1 is a schematic diagram illustrating a media flow converter within the context of a service application in accordance with the inventive arrangements disclosed herein.

Referring to FIG. 1 a media flow converter 105 is shown for use with a server 100 for coordinated streaming using a single Real Time Protocol (RTP) producer 130 for handling multiple audio services 140. The media flow converter 105 can include an RTP producer 130 and a plurality of audio objects 110 for directing the flow of media from at least one service 140 to a RTP client 180. The audio objects 110 can each have their own corresponding audio channel 120 for delivering media. For example, the services 140 can include Text-to-Speech Synthesis (TTS) or music streaming. In one example, the RTP client 180 can reside on a remote server and request a media streaming service such as TTS from the server 100. The server 100 can host multiple service applications running simultaneously to support multiple RTP clients 180 through a Real Time Protocol (RTP). Each service 140 can have a corresponding audio object 110 within the media converter 105 assigned to a service 140 for handling the service. An audio object 110 can be assigned to a service for handling the requirements of the service. For instance, an audio object 110 can open up a socket connection to a service 140 for receiving media. The socket can be over TCP for a streaming connection or UDP for a datagram connection. Each audio object 110 can be responsible for ensuring connectivity with the service as well as controlling access to the media.

The audio objects 110 can each include an audio queue 112 for receiving media. The audio queues 112 can support the media received from the service 140 along the audio channel 120 to the RTP client 180 or the RTP producer 130. The audio channels 120 are the communication channels for sending and receiving data between the services 140 and the RTP clients 180. The audio objects 110 can control the flow of delivery from each service by setting the size of receive buffers, or queues 112. In one arrangement, the audio threads 110 can packetize audio media provided by the service 140 into RTP format. For example, the audio object receives media from the services 180 and can partition and encapsulate the media into RTP packets placed on the audio queue 112. The RTP packets can comply with RTP format for keeping the packets sizes sufficiently small to ensure reliable delivery, but not too small to make the number of required deliveries inefficient.

The RTP producer 130 determines which RTP clients 180 require media delivery, and which corresponding audio objects 120 are prepared and ready for delivering the RTP packets to support the service. The RTP producer 130 can direct methods within the audio objects 112 to send RTP packets within the queue 112 to the RTP Client 180 for rendering the media at the client 180. In one arrangement, the RTP producer 130 can include a timer 132 for determining when RTP packets from a service 140 should be sent to a RTP Client for achieving real-time delivery. The timer 130 can obtain a native clock from the underlying operating system or from a software abstraction. For, example, the timer 130 can directly reference the operating system clock using a native function call written in the native programming language. The native language can be the C language. For instance, the media flow converter 105 can include native method calls using a Java interface to a C function for acquiring the granularity of the system clock. The RTP producer 130 can reference the timer 132 to schedule delivery of RTP packets from the audio threads 110. The RTP producer 130 can produce a delivery schedule for coordinating the delivery of RTP packets from each of the audio objects 110. The delivery schedule can include a list of audio objects and with their corresponding delivery time requirements.

For example, the RTP producer 130 can be a single real-time thread that operates on a set of small audio objects according to a delivery schedule. After sleeping for a pre-specified time interval, for instance 1 ms, the RTP producer 130 calls a method in each audio object 110. The 'send' method of the audio objects 110 can decide whether it is 'time' to send another RTP packet to a client from its audio queue. The underlying thread to the audio object can provide a time stamp as to how long the audio object has been waiting. The RTP producer 130 steps through the list allowing each audio object to provide their service. For example, every 1 ms, the RTP producer 130 calls each audio object 110. Each object checks to see how long each audio channel has been waiting to send. If the channel has been waiting 19-20 ms, the audio object removes the RTP packet from its queue and sends it to the client. For example, in audio streaming applications, RTP audio packets must be sent at 20 ms intervals to achieve real-time.

The audio objects can each have their own thread of execution apart from the RTP producer thread. These are separate audio threads that can operate in non real-time to receive audio data from the services. The single real-time thread of the RTP producer can operate in real time to provide a continuous service. The non-real time threads of the audio objects can build the audio queue and convert the audio data to RTP packets on the queue. The RTP producer can call on an audio object to remove RTP packets from the queue and send them to a client based on the delivery schedule.

The media flow converter 105 can be a J2EE object implemented in a J2EE platform. For example, the media flow converter 105 can be a software component designed for real-time streaming using a configuration of the J2EE Java Connector Architecture (JCA) Resource Adapter (RA) for connectivity. The media flow converter 105 can provide real-time services 140 to multiple MCRPs 180 by delegating the administrative task of coordinating streams to the RTP producer 130. The RTP producer 130 can monitor delivery status for the RTP Client and access the thread schedule to determine when proceeding RTP packet deliveries should occur.

Figure 2:
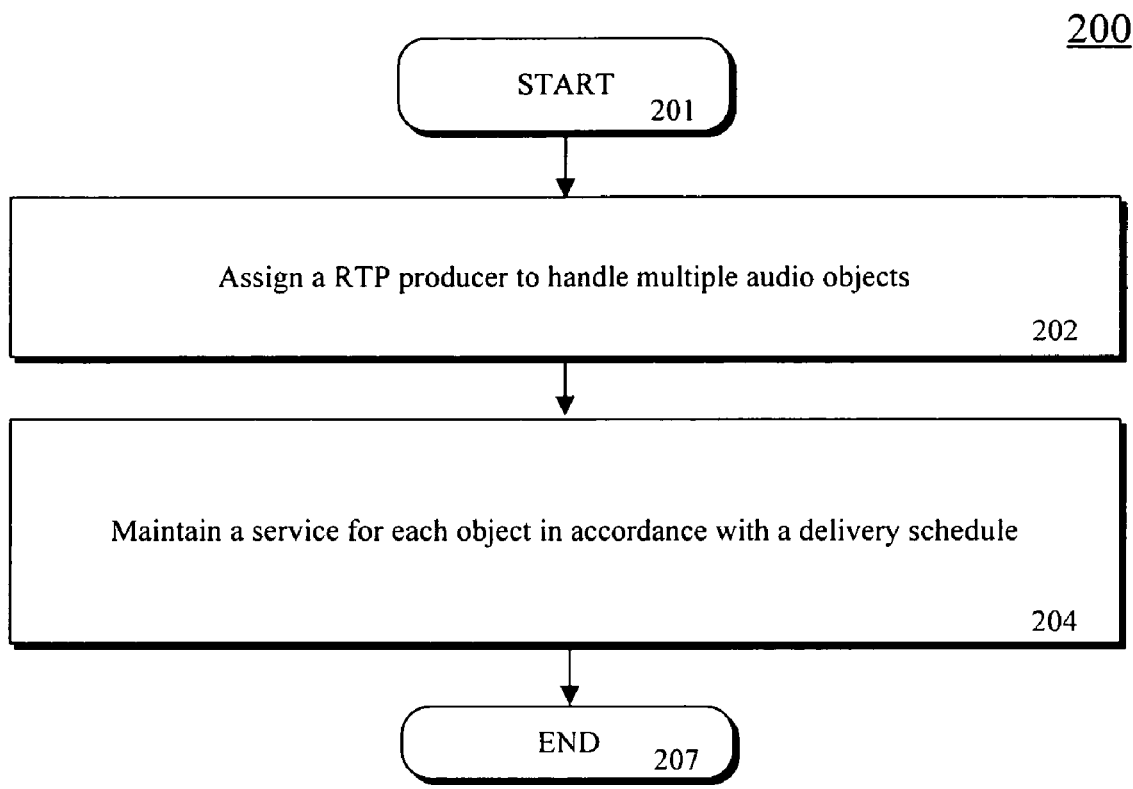
FIG. 2 is a method for packetizing at least one media stream into a continuous media stream in accordance with the inventive arrangements disclosed herein.

Referring to FIG. 2, a method 200 is shown for coordinated streaming using a single Real Time Protocol (RTP) producer to handle multiple audio services. To describe the method 200, reference will be made to FIG. 1, although the method 200 can be implemented in any other suitable device or system using other suitable components. Moreover, the method 200 is not limited to the order in which the steps are listed in the method 200, and can contain a greater or a fewer number of steps than those shown in FIG. 2.

At step 201, the method can start. At step 202 an RTP producer can be assigned for handling at least one audio object using a delivery schedule. For example, referring to FIG. 1, the media flow converter 105 assigns a high priority thread to the RTP producer 130. The RTP producer 130 accesses the audio objects 110 based on a delivery schedule. For example, the RTP producer 130 can sleep for a specified time, and upon wake, call the audio objects 110 in the list. Each audio object 110 determines if it is ready to send audio data to a client. At step 204, a service can be maintained for each object in accordance with a delivery schedule. For example, referring to FIG. 1, each audio object 110 receive audio data from a service 140. The audio objects are responsible for delivering the audio service 140 to their RTP client 180. The RTP producer 130, upon identifying which audio objects require client servicing, relinquish control to the audio object for sending RTP packets. For example, RTP packets within an at least one audio channel can be sent to a client according to the delivery schedule. For example, referring to FIG. 1, the RTP producer 130 directs method calls within the audio objects 110 to send RTP packets from the audio queue 112 to a corresponding RTP client for receiving the media associated with the service 140. The RTP producer 130 directs the control of media from each audio object to each corresponding RTP client 180, and each audio thread is responsible for providing the RTP packets across an audio channel 120. Each audio object 110 controls access to at least one audio channel 120 for providing the RTP packets to the RTP client 180. The RTP producer 130 opens and closes an audio channel as new services are added. The channels can remain open for the delivery of RTP packets but do not necessarily have to be active at all times. The single RTP producer 130 priority thread determines when RTP packets are delivered, and accordingly when the audio channels 120 are active. For example, the RTP producer 130 checks the schedule and determines which audio objects 110 need to send RTP packets to make a timely delivery.

A native timer can be obtained to comply with the real-time requirements of the media rendering client for providing continuous real-time delivery of the continuous media stream. For example, referring to FIG. 1, the RTP producer 130 determines which audio objects 110 are responsible for providing RTP packets to RTP clients 180, and opens, or resumes, channels of communication between the audio objects and the RTP clients 180. The RTP producer 130 assigns delivery of the next RTP packets to the audio thread 120 with the highest time delivery priority. In one arrangement, a lower level audio object (RTPTask) keeps track of whether it is time to send out a RTP packet or not. The RTP producer calls all of the tasks that are active whenever the timer fires. The audio objects are left to their own discretion to determine whether to send data or not. For example, the timer 132 assigns sleep times and wake times to the RTP producer thread. When the timer 132 goes off, the RTP producer wakes up and identifies which audio objects need to send RTP packets based on a RTP timing structure. For example, an audio object that has been waiting 19 ms may be identified to send packets. However, the audio object may decide on behalf of the RTP client, whether the client needs the audio data. The timer ensures that real-time delivery is coordinated, but it is up to the audio object to control the media flow.

In one example, a first RTP client can have a buffer that allows it to receive a large delivery of RTP packets. The first RTP client can have its own mechanisms for rendering the RTP packets into a media stream. Accordingly, a second RTP Client may have a small buffer that requires deliveries more often to keep the flow of media continuous. The second RTP Client may not have the capacity or capabilities of rendering the RTP packets to a continuous media stream. When the RTP clients negotiate the data exchange information at session startup, audio threads within the audio objects are assigned for the client which contain information pertaining to the needs of the client, such as the codec required. The RTP producer may not have knowledge of the different needs of different RTP clients. The audio threads and lower level objects such as an RTPTask object negotiates the session capabilities. At step 207, the description of the method steps for coordinated streaming can end.

Figure 3:
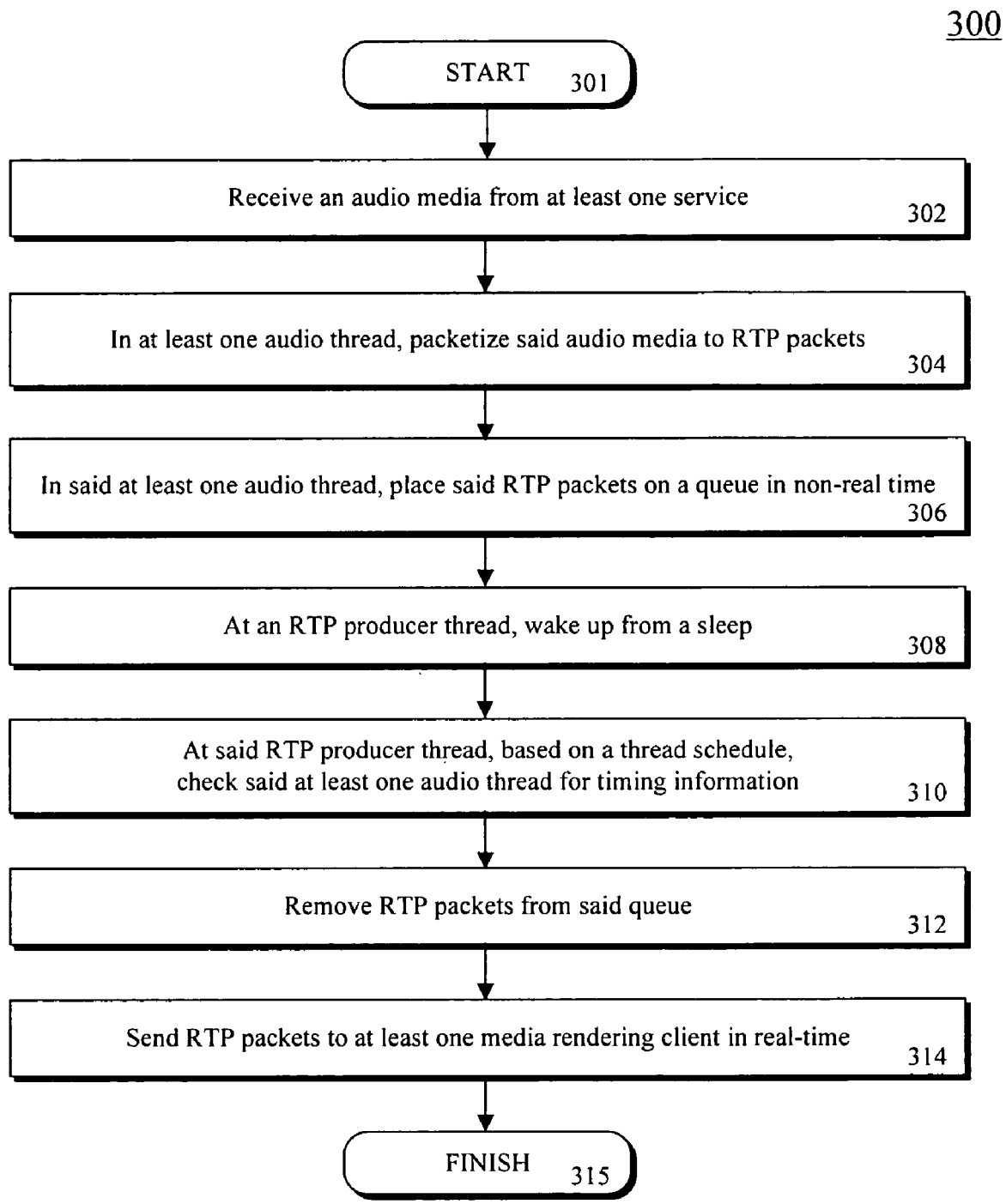
FIG. 3 is a flowchart showing a method for packetizing at least one non-real-time media stream into a continuous real-time media stream for Real Time Protocol (RTP) delivery in accordance with the inventive arrangements disclosed herein.

Referring to FIG. 3, a method 300 is shown for packetizing at least one non-real-time media stream into a continuous real-time media stream. To describe the method 300, reference will be made to FIG. 1, although the method 300 can be implemented in any other suitable device or system using other suitable components. Moreover, the method 300 is not limited to the order in which the steps are listed in the method 300, and can contain a greater or a fewer number of steps than those shown in FIG. 3. The method 300 can be incorporated within the media flow converter within a WebSphere Voice Server application hosted by a WebSphere Application Server. The method 300 can comply with real-time delivery requirements of a media rendering client for providing continuous real-time delivery of said continuous media stream.

At step 301 the method can start. At step 302, an audio media can be received from at least one service. For example, the audio media can be voice notes produced by a TTS service 140. For example, referring to FIG. 1, an audio object 110 can be assigned to the TTS service. The media flow converter 105 can communicate the voice notes to a RTP client 180 using the control flow mechanisms provided by the RTP producer 130. The audio object can open a connection with the service to receive the audio media and place it on the audio queue 112. The audio media can be delivered in non-real-time and placed on the audio queue 112 in non-real-time. At step 304, at least one audio object can packetize the audio media to RTP packets. The packetizing can be in non-real-time. For example, referring to FIG. 1, the audio object can encapsulate the audio media on the audio queue 112 into RTP packets before a delivery is scheduled. The audio object 110 can place audio media on the audio queue 112 as the media becomes available by the service 140. At step 306, in at least one audio object, the RTP packets are placed on a queue in non-real time: For example, referring to FIG. 1, the audio queue 110 has limited memory and buffers RTP packets in a pipeline fashion to align the packets in memory for preparation of efficient delivery. During this time, the server 100 can simultaneously provide multiple services to other RTP clients 180. The media flow converter 105 facilitates the delivery of RTP data for high volume traffic by assigning the single high priority thread to the RTP producer 130 for assigning delivery priorities to the audio objects 110. The RTP producer 130 continually monitors delivery progress for each RTP client and monitors the capacity of the services 140 for providing the media to support the service to the clients. In order to do so, the RTP producer 130 sets a delivery schedule. The delivery schedule complies with real-time requirements of the media rendering client. The single high priority thread assigned to the RTP producer 130 can sleep, wake and stop. RTP delivery times can be scheduled based the thread sleep and wake times.

During sleep time, the thread is not executing a process to conserve processing power. As more processes are added more threads can be added to accommodate the tasks with each thread consuming more CPU time, interrupts, and schedules. Alternatively, new tasks can be assigned to the same thread and the sleep time can be decreased to provide additional time for the thread to process the additional tasks. However, the sleep time can only be reduced so far before timing resolution is sacrificed.

At step 308, the RTP producer thread can wake up from a sleep. The RTP producer thread is the RTP producer supporting the single high priority thread. The RTP producer 130 cycles through the thread schedule on a continual basis to track delivery progress based on the sleep and wake periods. Accordingly, the RTP producer 130 cycles through the list at intervals set by a Timer 132 corresponding to when the single high priority thread sleeps. Timer 132, which has reference to a clock, provides the granularity to specify precise delivery times as well as assess timing progress across the audio threads 120. At step 308, the RTP producer thread, based on the thread schedule, checks at least one audio thread for timing information. At step 308, The RTP producer can remove RTP packets from said queue. For example, referring to FIG. 1, the RTP producer 130 can remove RTP packets from the audio queue 112 and send them in a sequential format to achieve continuous real-time delivery. For instance, the RTP packets were arranged without a real-time constraint, they were placed on the queue 112 in non-real time. However, the RTP Client 180 can require a continuous stream of media delivered in real-time, The RTP producer 130 transmits the RTP packets for satisfying real-time delivery demands. And, at step 308, the RTP producer can send RTP packets to at least one media rendering client. For example, referring to FIG. 1, for a TTS service, the RTP producer 130, can remove RTP data packets contained within the TTS audio queue 112 of the audio channel 120 available to the TTS audio object 110. Alternatively, the RTP producer 130 can delegate authority to the TTS audio thread containing the RTP packets in the queue 112 to send the RTP packet directly to the RTP Client. The single high priority thread controls the delivery of media for all audio channels 120 on the server 100.

The present invention can be realized in hardware, software, or a combination of hardware and software. The present invention can be realized in a centralized fashion in one computer system, or in a distributed fashion, where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented system for coordinated media streaming comprising:
   a processor;
   a media flow converter for use with a server for simultaneously delivering media from multiple audio services to multiple Real Time Protocol (RTP) clients, the media flow converter including:
   a plurality of audio objects, each audio object having an audio queue for receiving media from one of the multiple audio services and an audio channel for directing a flow of media received from one of the multiple audio services to one of the multiple RTP clients, wherein each audio object has a non real time thread for receiving media, building the audio queue, and packetizing received media into RTP packets to be placed on the audio queue; and
   a single RTP producer having a single real-time thread and a timer for coordinating a delivery of RTP packets from each of the audio objects to a corresponding RTP client based on a delivery schedule to achieve real-time delivery;
   wherein said RTP producer sleeps for a pre-specified interval, and upon wake, prioritizes service delivery based on said audio objects' wait time.

2. The system of claim 1, wherein said delivery schedule complies with real-time requirements of said RTP client for providing continuous real-time delivery of media from said server to said RTP client.

3. The system of claim 1, wherein the timer is a native timer that determines a sleep time and a wait time for each audio object.

4. The system of claim 3, wherein said RTP producer updates said delivery schedule based on a wait time of each audio object, wherein said wait time is the amount of time an audio object has been waiting to send RTP packets.

5. The system of claim 1, wherein said audio services can be one of a text-to-speech service, an audio processing service, and a music processing service.

6. The system of claim 1, wherein said audio services are provided by a WebSphere Voice Server running on said server, wherein said server is a WebSphere Application Server, and wherein WebSphere Voice Server is integrated with said WebSphere Application Server for providing a mix of java transaction based processing and soft-real-time processing for interfacing with said media converter using a J2EE framework.

7. The system of claim 6, wherein WebSphere Voice Server provides speech recognition and synthesis support to at least one said media converter hosting a Web-based VoiceXML application, wherein the support is for at least one real-time continuous media stream connecting said WebSphere Application Server with said Web-based VoiceXML application.

8. The system of claim 6, wherein said single real-time thread controls communication between said WebSphere Voice Server and WebSphere Application Server for achieving real-time delivery.

9. A computer-implemented method for coordinated streaming, the method comprising the steps of:
   configuring the computer to provide a media flow converter for use with a server for simultaneously delivering media from multiple audio services to multiple Real Time Protocol (RTP) clients, the media flow converter including:
   a plurality of audio objects, each audio object having an audio queue for receiving media from one of the multiple audio services and an audio channel for directing a flow of media received from one of the multiple audio services to one of the multiple RTP clients, wherein each audio object has a non-real time thread for receiving media, building the audio queue, and packetizing the received media into RTP packets to be placed on the audio queue; and
   a single RTP producer having a single real-time thread and a timer;
   receiving media from at least one of the multiple audio services to at least one of the plurality of audio objects;
   each audio object packetizing received media into RTP packets and placing the RTP packets on the audio queue of the audio object;
   the RTP producer accessing the audio objects based on a delivery schedule; and the RTP producer coordinating a delivery of RTP packets from each of the audio objects to a corresponding RTP client in accordance with the delivery schedule to achieve real-time delivery;
   wherein said RTP producer sleeps for a pre-specified interval, and upon wake, prioritizes service delivery based on said wait time.

10. The method of claim 9, wherein said delivery schedule complies with real-time requirements of each RTP client thereby providing continuous real-time service delivery.

11. The method of claim 9, further comprising:
   determining at least one wait time that an audio object has been waiting to send RTP packets; and
   updating said delivery schedule in view of said wait time.

12. The method of claim 11, wherein the timer is a native timer which determines a sleep time and wait time for an audio object.

* * * * *